United States Patent
Chittibabu et al.

(10) Patent No.: US 7,323,635 B2
(45) Date of Patent: Jan. 29, 2008

(54) PHOTOVOLTAIC CELL

(75) Inventors: Kethinni G. Chittibabu, Nashua, NH (US); Jin-An He, Lowell, MA (US); Lynne Ann Samuelson, Marlboro, MA (US); Lian Li, N. Chelmsford, MA (US); Sukant Tripathy, deceased, late of Acton, MA (US); by Susan Tripathy, legal representative, Acton, MA (US); Jayant Kumar, Westford, MA (US); Srinivasan Balasubramanian, Woburn, MA (US)

(73) Assignees: University of Massachusetts, Boston, MA (US); The United States of America as represented by the Secretary of the Army, Washington, DC (US)

( * ) Notice: Subject to any disclaimer, the term of this patent is extended or adjusted under 35 U.S.C. 154(b) by 165 days.

(21) Appl. No.: 10/165,877

(22) Filed: Jun. 10, 2002

(65) Prior Publication Data

US 2003/0056821 A1 Mar. 27, 2003

Related U.S. Application Data

(60) Provisional application No. 60/298,858, filed on Jun. 15, 2001.

(51) Int. Cl.
*H01L 31/0236* (2006.01)
(52) U.S. Cl. ........................ 136/263; 136/256; 257/40; 257/43; 257/431; 429/111
(58) Field of Classification Search ................ 136/263, 136/256; 257/40, 43, 431; 429/111
See application file for complete search history.

(56) References Cited

U.S. PATENT DOCUMENTS

| | | | |
|---|---|---|---|
| 4,232,108 A | 11/1980 | Dessauer | |
| 4,295,329 A | 10/1981 | Windley | |
| 4,927,721 A | 5/1990 | Gratzel et al. | |
| 5,728,487 A | 3/1998 | Gratzel et al. | |
| 5,830,597 A | 11/1998 | Hoffmann et al. | |
| 5,885,657 A * | 3/1999 | Penth | 427/372.2 |
| 6,075,203 A | 6/2000 | Wang et al. | |
| 6,291,763 B1 * | 9/2001 | Nakamura | 136/256 |
| 6,444,189 B1 | 9/2002 | Wang et al. | |
| 6,580,026 B1 * | 6/2003 | Koyanagi et al. | 136/263 |
| 6,649,824 B1 * | 11/2003 | Den et al. | 136/256 |
| 6,706,963 B2 * | 3/2004 | Gaudiana et al. | 136/263 |

(Continued)

FOREIGN PATENT DOCUMENTS

EP 0993050 4/2000

(Continued)

OTHER PUBLICATIONS

Cao et al, "A Solid State Sensitized Photoelectrochemical Cell," J. Phys. Chem., vol. 99, pp. 17071-17073, (1995).*

(Continued)

*Primary Examiner*—Nam Nguyen
*Assistant Examiner*—Anthony Fick
(74) *Attorney, Agent, or Firm*—Fish & Richardson P.C.

(57) ABSTRACT

A method of making a photovoltaic cell includes contacting a cross-linking agent with semiconductor particles, and incorporating the semiconductor particles into the photovoltaic cell.

20 Claims, 4 Drawing Sheets

U.S. PATENT DOCUMENTS

| | | | |
|---|---|---|---|
| 6,858,158 B2* | 2/2005 | Chittibabu et al. | 252/183.11 |
| 6,900,382 B2* | 5/2005 | Chittibabu et al. | 136/256 |
| 6,913,713 B2* | 7/2005 | Chittibabu et al. | 252/501.1 |
| 6,924,427 B2* | 8/2005 | Eckert et al. | 136/252 |
| 2002/0042343 A1 | 4/2002 | Akui et al. | |
| 2003/0140959 A1* | 7/2003 | Gaudiana et al. | 136/244 |
| 2003/0188777 A1* | 10/2003 | Gaudiana et al. | 136/263 |
| 2003/0189402 A1* | 10/2003 | Gaudiana et al. | 313/507 |
| 2003/0192584 A1* | 10/2003 | Beckenbaugh et al. | 136/256 |
| 2003/0192585 A1* | 10/2003 | Beckenbaugh et al. | 136/263 |
| 2003/0230337 A1* | 12/2003 | Gaudiana et al. | 136/256 |
| 2004/0025933 A1* | 2/2004 | Chittibabu et al. | 136/263 |
| 2004/0025934 A1* | 2/2004 | Chittibabu et al. | 136/263 |
| 2004/0031520 A1* | 2/2004 | Ryan | 136/263 |

FOREIGN PATENT DOCUMENTS

| | | | |
|---|---|---|---|
| EP | 993050 A2 * | 4/2000 | |
| JP | 07-116503 | 5/1995 | |
| JP | 7-116503 A * | 5/1995 | |
| JP | 2000-294306 A | 10/2000 | |
| WO | WO 01/25316 | 4/2001 | |
| WO | WO 01/25316 A1 * | 4/2001 | |

OTHER PUBLICATIONS

Bach et al., "Solid-state dye-sensitized mesoporous $TiO_2$ solar cells with high photon-to-electron conversion efficiencies", *Nature*, vol. 395, pp. 583-585, Oct. 1998.

Carotta et al., "Preparation and Characterization of Nanostructured Titania Thick Films", Advanced *Materials.*, vol. 11, No. 11, pp. 943-946, 1999.

Gomez et al., "Nanocrystalline Ti-oxide-based solar cells made by sputter deposition and dye sensitization: Efficiency versus film thickness", *Solar Energy Materials & Solar Cells*, vol. 62, pp. 259-263, 2000.

Green, M.A., "Photovoltaics: technology overview", *Energy Policy*, vol. 28, pp. 989-998, 2000.

Gregg, Brian A., "Bilayer molecular solar cells on spin-coated $TiO_2$ substrates", *Chemical Physics Letters*, vol. 258, pp. 376-380, 1996.

Hagfeldt et al., "Molecular Photovoltaics", *Accounts of Chemical Research*, vol. 33, pp. 269-277, 2000.

Li et al., "Titanium dioxide films for photovoltaic cells derived from a sol-gel process", *Solar Energy Materials and Solar Cells*, vol. 56, pp. 167-174, 1999.

Mikoshiba et al., "Highly efficient photoelectrochemical cell with novel polymer gel electrolytes", Conference Organizers, 3 pages, date unknown.

Nasr et al., "Role of Iodide in Photoelectrochemical Solar Cells. Electron Transfer between Iodide Ions and Ruthenium Polypyridyl Complex Anchored on Nanocrystalline $SiO_2$ and $SnO_2$ Films", *J. Phys. Chem. B*, vol. 102, pp. 4944-4951, 1998.

O'Regan et al., "A low-cost, high-efficiency solar cell based on dye-sensitized colloidal $TiO_2$ films", *Nature*, vol. 353, pp. 737-740, Oct. 1991.

Park et al., "Comparison of Dye-Sensitized Rutile- and Anatase-Based $TiO_2$ Solar Cells", *J. Phys. Chem. B*, vol. 104, pp. 8989-8994, 2000.

Petritsch et al., "Dye-based donor/acceptor solar cells", *Solar Energy Materials & Solar Cells*, vol. 61, pp. 63-72, 2000.

Phani et al., "Titania solar cells: new photovoltaic technology", *Renewable Energy*, vol. 22, pp. 303-309, 2001.

Pichot et al., "Low-Temperature Sintering of $TiO_2$ Colloids: Application to Flexible Dye-Sensitized Solar Cells", *Langmuir*, vol. 16, pp. 5626-5630, 2000.

Pichot et al., "The Photovoltage-Determining Mechanism in Dye-Sensitized Solar Cells", *J. Phys. Chem. B*, vol. 104, pp. 6-10, 2000.

Ruile et al., "Novel sensitisers for photovoltaic cells. Structural variations of Ru (II) complexes containing 2,6-bis (1-methylbenzimidazol-2-yl) pyridine", *Inorganica Chimica Acta*, vol. 261, pp. 129-140, 1997.

Schawarzburg et al., "Origin of Photovoltage and Photocurrent in the Nanoporous Dye-Sensitized Electrochemical Solar Cell", *J. Phys. Chem B.*, vol. 103, No. 28, pp. 5743-5746, 1999.

Smestad, Greg P., "Education and solar conversion: Demonstrating electron transfer", *Solar Energy Materials and Solar Cells*, vol. 55, pp. 157-178, 1998.

Sommeling et al., "Flexible Dye-Sensitized Nanocrystalline $TiO_2$ Solar Cells", Conference Organizers, 5 pages, date unknown.

Trupke et al., "Dependence of the Photocurrent Conversion Efficiency of Dye-Sensitized Solar Cells on the Incident Light Intensity", *J. Phys. Chem. B*, vol. 104, pp. 11484-11488, 2000.

Cao et al., "A Solid State, Dye Sensitized Photoelectrochemical Cell", J. Phys. Chem. 99:17071-73 (1995).

International Search Report mailed Mar. 19, 2004.

IPER mailed Sep. 2, 2004.

Mikoshiba et al., "Highly efficient photoelectrochemical cell with novel polymer gel electrolytes", Conference Organizers, 3 pages, date not available.

Sommeling et al., "Flexible Dye-Sensitized Nanocrystalline $TiO_2$ Solar Cells", Conference Organizers, 5 pages, date not available.

* cited by examiner $TiX_4$ (X = -OR, Cl)

US 7,323,635 B2

PHOTOVOLTAIC CELL

CLAIM OF PRIORITY

This application claims priority under 35 USC §119(e) to U.S. patent application Ser. No. 60/298,858, filed on Jun. 15, 2001, the entire contents of which are hereby incorporated by reference.

STATEMENT AS TO FEDERALLY SPONSORED RESEARCH OF DEVELOPMENT

Funding for the work described herein was provided by the federal government, which has certain rights in the invention.

FIELD OF THE INVENTION

The invention relates to photovoltaic cells.

BACKGROUND

Photovoltaic cells, sometimes called solar cells, can convert light, such as sunlight, into electrical energy. One type of photovoltaic cell is sometimes called a dye-sensitized solar cell (DSC).

Referring to FIG. 1, one embodiment of a DSC 10 includes a first glass substrate 12 and a second glass substrate 14. Each substrate 12 and 14 has deposited thereon a transparent conducting coating, such as a layer of fluorine-doped tin oxide, 16 and 18, respectively. DSC 10 further includes, sandwiched between substrates 12 and 14, a semiconductor layer 20 (e.g., $TiO_2$ particles), a sensitizing dye layer 22, an electrolyte 24 (e.g., $I^-/I_3^-$), and a catalyst layer 26 (e.g., Pt). Semiconductor layer 20 is deposited on coating 16 of first substrate 12. Dye layer 22 is sorbed on semiconductor layer 20, e.g., as a monolayer. Together, substrate 12, coating 16, semiconductor layer 20, and dye layer 22 form a working electrode. Catalyst layer 26 is deposited on coating 18 of second substrate 14, and together these components 14, 18, and 26 form a counter electrode. Electrolyte 24 acts as a redox mediator to control the flow of electrons from the counter electrode to the working electrode.

During use, cell 10 undergoes cycles of excitation, oxidation, and reduction that produce a flow of electrons, i.e., electrical energy. Incident light excites dye molecules in dye layer 22. The photoexcited dye molecules then inject electrons into the conduction band of semiconductor layer 20, which leaves the dye molecules oxidized. The injected electrons flow through semiconductor layer 20 to an external load 28 to provide electrical energy. After flowing through load 28, the electrons reduce electrolyte 24 at catalyst layer 26. The reduced electrolyte can then reduce oxidized dye molecules back to their neutral state. This cycle of excitation, oxidation, and reduction is repeated to provide continuous electrical energy to the load.

In some cell fabrication processes, substrate 12, coating 16 and semiconductor layer 20 are sintered at relatively high temperatures, e.g., about 450-500° C., to provide good contact between the semiconductor particles and between the semiconductor layer and the coating. As a result, certain components of a photovoltaic cell can be limited to materials that are stable at relatively high temperatures, such as rigid glass. Limitations on useable materials can, in turn, limit the selection of manufacturing processes, e.g., to batch processes.

SUMMARY OF THE INVENTION

The invention relates to photovoltaic cells. In particular, the invention relates to photovoltaic cells having one or more flexible substrates that can be manufactured at So relatively low temperatures in a continuous process, such as a roll-by-roll or sheet-by-sheet process. Flexible photovoltaic cells can be used, for example, in canopies for defense, commercial, residential, and agricultural applications.

In one aspect, the invention features a method of making a photovoltaic cell. The method includes contacting a cross-linking agent with semiconductor particles, and incorporating the semiconductor particles into the photovoltaic cell.

Embodiments may include one or more of the following features. The cross-linking agent includes an organometallic molecule, e.g., a metal alkoxide, a metal acetate, or a metal halide. The cross-linking agent and the semiconductor particles include an identical chemical element, e.g., a metal such as titanium, zirconium, or zinc. The cross-linking agent and the semiconductor particles include an identical chemical bond, e.g., a metal to non-metal bond such as a metal-oxygen bond. The cross-linking agent includes a sol-gel precursor.

The semiconductor particles can be disposed on a first substrate. The method can further include electrically connecting a second substrate to the first substrate. The semiconductor particles can be disposed between the first and second substrates. The first and/or the second substrate can be flexible, e.g., including a polymeric material such as poly(ethyleneterephthalate) or poly(ethylenenaphthalate). The substrate(s) can include a polyimide.

The method can further include applying a dye on the semiconductor particles. The method can further include heating the first substrate to less than about 400° C. The method can further include incorporating a polymeric electrolyte into the photovoltaic cell.

In another aspect, the invention features a photovoltaic cell including a first substrate having cross-linked semiconductor particles disposed thereon and a second substrate electrically connected to the first substrate.

Embodiments may include one or more of the following features. One or both of the substrates are flexible. The substrate(s) includes a polymeric material, e.g., a polyimide. The semiconductor particles are between the first and second substrates. The cell further includes a polymeric polyelectrolyte between the first and second substrates. The polyelectrolyte can include, for example, about 5% to about 100%, e.g., 5-60%, 5-40%, or 5-20%, by weight of a polymer, e.g., an ion-conducting polymer, about 5% to about 95%, e.g., about 35-95%, 60-95%, or 80-95%, by weight of a plasticizer and about 0.05 M to about 10 M of a redox electrolyte, e.g., about 0.05 M to about 10 M, e.g., 0.05-2 M, 0.05-1 M, or 0.05-0.5 M, of organic or inorganic iodides, and about 0.01M to about 1 M, e.g., 0.05-5 M, 0.05-2 M, or 0.05-1 M, of iodine. The cell further includes a dye disposed on the semiconductor particles.

The semiconductor particles can be crosslinked by a material including an identical chemical element, e.g., a metal such as titanium, zirconium, or zinc, as in the semiconductor particles. The semiconductor particles can be crosslinked by a material including an identical chemical bond, e.g., a metal to non-metal bond such as a metal-oxygen bond, as in the semiconductor particles.

In another aspect, the invention features a method of fabricating a photovoltaic cell including (a) forming a first electrode comprising semiconductor particles disposed on a flexible substrate, (b) forming a second electrode comprising a second substrate, and (c) continuously joining the first and second electrodes to form the photovoltaic cell.

Embodiments may include one or more of the following features. Step (a) includes contacting the semiconductor particles with a cross-linking agent. Step (a) includes heating the first electrode to less than about 400° C., wherein, for example, heating is performed after contacting the particles with a cross-linking agent. Step (a) includes applying a polymeric polyelectrolyte to the first electrode. The polyelectrolyte can include, for example, about 5% to about 100%, e.g., 5-60%, 5-40%, or 5-20%, by weight of a polymer, e.g., an ion-conducting polymer, about 5% to about 95%, e.g., about 35-95%, 60-95%, or 80-95%, by weight of a plasticizer and about 0.05 M to about 10 M of a redox electrolyte, e.g., about 0.05 M to about 10 M, e.g., 0.05-2 M, 0.05-1 M, or 0.05-0.5 M, of organic or inorganic iodides, and about 0.01M to about 1 M, e.g., 0.05-5 M, 0.05-2 M, or 0.05-1 M, of iodine. The second substrate is flexible. Step (b) includes forming a catalyst on the second substrate. The method can further include contacting the semiconductor particles with a dye.

In another aspect, the invention features a method of fabricating a photovoltaic cell including forming a first electrode which includes applying semiconductor particles onto a flexible first substrate and applying a polymeric electrolyte onto the first substrate, wherein forming the first electrode is performed in a continuous process.

Embodiments may include one or more of the following features. The method further includes contacting a cross-linking agent with the semiconductor particles. The method further includes heating the first electrode to less than about 400° C. after contacting the cross-linking agent with the semiconductor particles. The method further includes contacting a dye with the particles. The method further includes forming a second electrode having a catalyst disposed thereon. The second electrode is formed in a continuous process. The method further includes continuously joining the first and second electrodes to form the photovoltaic cell.

In another aspect, the invention features a photovoltaic cell including a first electrode, a second electrode, and a polymeric electrolyte between the first and second electrodes. The polyelectrolyte can include, for example, about 5% to about 100%, e.g., 5-60%, 5-40%, or 5-20%, by weight of a polymer, e.g., an ion-conducting polymer, about 5% to about 95%, e.g., about 35-95%, 60-95%, or 80-95%, by weight of a plasticizer and about 0.05 M to about 10 M of a redox electrolyte, e.g., about 0.05 M to about 10 M, e.g., 0.05-2 M, 0.05-1 M, or 0.05-0.5 M, of organic or inorganic iodides, and about 0.01M to about 1 M, e.g., 0.05-5 M, 0.05-2 M, or 0.05-1 M, of iodine.

Embodiments may include one or more of the following advantages. Cross-linking the semiconductor particles can provide particles with good integrity and stability. As a result, in some circumstances, the particles need not be sintered at high temperatures, thereby increasing the selection of materials that can be used for the substrates. For example, the substrates can include materials with relatively low temperature stability such polymeric materials, which can make the cells relatively light in weight. Flexible substrates are amendable to continuous or semi-continuous manufacturing processes with relatively high throughput rates. The polymeric polyelectrolyte can also be conveniently applied during a continuous or semi-continuous fabrication process. As a result, manufacturing can be performed with relatively inexpensive processing techniques and materials, and unit cost can be relatively cost-effective and costcompetitive.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
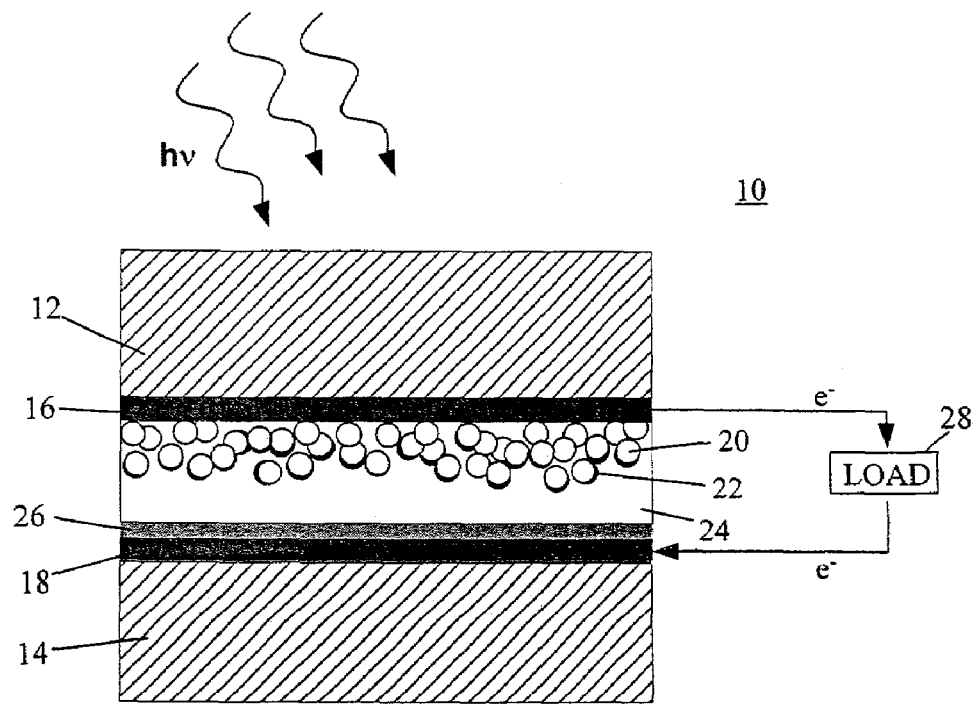
FIG. 1 is a cross-sectional view of an embodiment of a photovoltaic cell.
Figure 2:
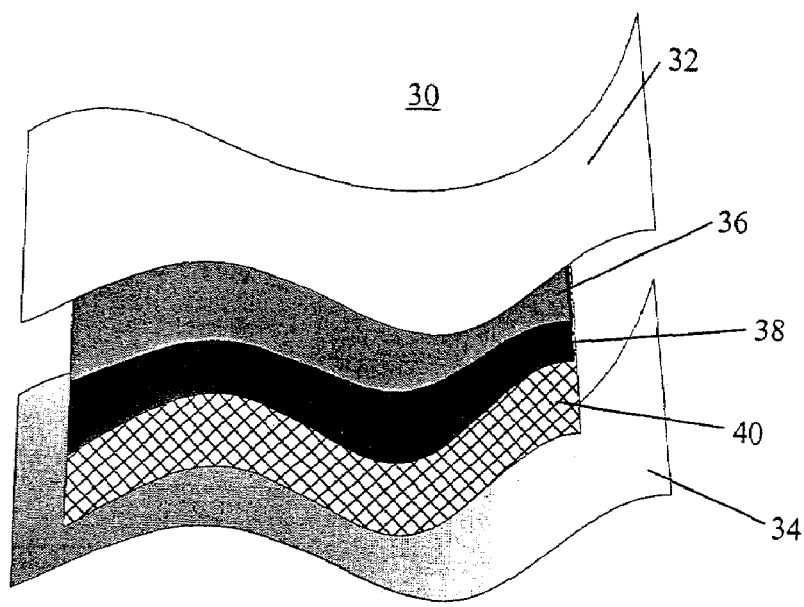
FIG. 2 is an exploded view of an embodiment of a photovoltaic cell.

Referring to FIG. 2, one embodiment of a flexible photovoltaic cell 30 includes a first polymeric substrate 32 and a second polymeric substrate 34. Both substrates 32 and 34 are flexible and have a transparent conductive coating (not shown) deposited thereon. Cell 30 further includes, between substrates 32 and 34, a dye-sensitized semiconductor layer 36, a polymeric polyelectrolyte layer 38, and a catalyst layer 40. Substrate 32 and semiconductor layer 36 together form a working electrode or a photoelectrode; and substrate 34 and catalyst layer together form a counter electrode.

Figure 3:
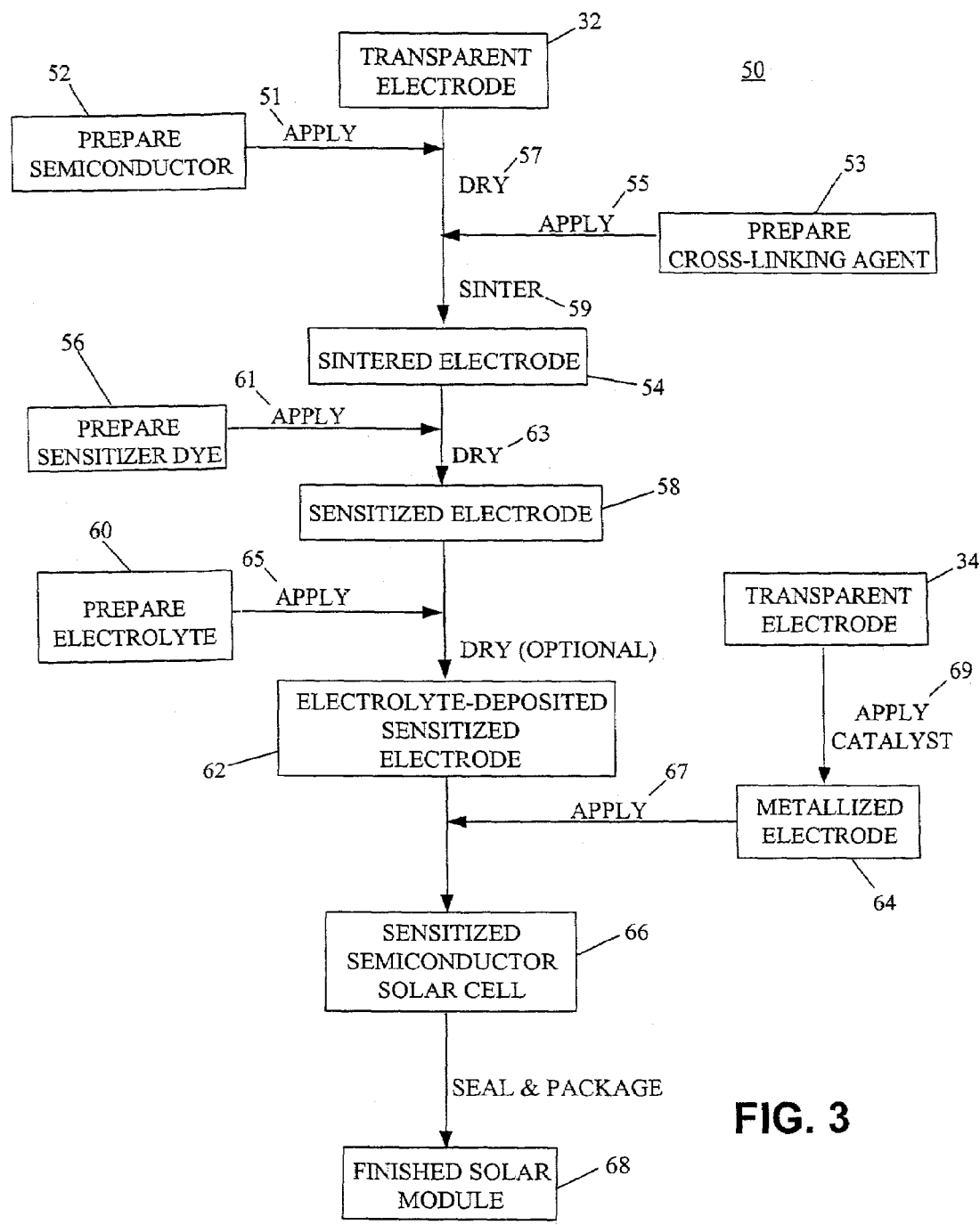
FIG. 3 is a block diagram of an embodiment of a process for making a photovoltaic cell.

FIG. 3 shows one embodiment of a process 50 for fabricating cell 30. Generally, semiconductor particles are deposited on first substrate 32, and the particles and the substrate are treated with a chemical cross-linking agent. Substrate 32 and the particles are then sintered, for example, at a relatively low temperature, such as about room temperature to less than about 200° C., depending on the materials used for the substrate. After sintering, the semiconductor particles are treated with a dye solution and then with a polymeric electrolyte. Separately, catalyst layer 40 is formed on second substrate 34. Substrates 32 and 34 are then applied together to form cell 30.

Substrate 32 is formed of a transparent and flexible material, such as a polymeric material. Preferably, substrate 32 has a thermal coefficient of expansion that is relatively low and/or comparable to the thermal coefficient of expansion of semiconductor layer 36 to minimize the occurrence of defects, such as cracks, during fabrication. Substrate 32 can be formed, for example, of polyethylene terephthalate (PET), polyethylene naphthalate (PEN), or a polyimide. An example of a polyimide is a KAPTON® polyimide film (available from E. I. du Pont de Nemours and Co.), which has a thermal stability up to about 400° C. and can be incorporated into flexible solar cells that are substantially non-transparent in the visible range. Substrate 32 can have a thickness of about 50 to about 1,000 microns, such as, for example, about 100 to about 500 microns, or about 150 to about 250 microns.

Substrate 32 includes a transparent and conductive coating formed thereon. In some embodiments, the transparent and conductive coating can be patterned on substrate 32 to define the voltage and current of cell 10. The coating, for example, indium tin oxide (ITO), can be deposited on an active area of substrate 32 by thermal evaporation or low temperature sputtering, for example, ambient sputtering. The active area of substrate 32 corresponds approximately to a predetermined area covered by semiconductor layer 36. A suitable conductor, e.g., a wire, can be connected to the conductive coating to be connected later to a load (not shown). The transparent and conductive coating can be about 100 nm to about 500 nm thick, e.g., about 100 to about 300 nm, or about 100 to about 200 nm.

Colloidal semiconductor particles are then deposited onto the transparent and conductive coating of substrate 32 to form a transparent, nanocrystalline semiconductor layer. The semiconductor particles, in part, provide substrate 32 with high surface area, thereby maximizing the amount of dye that can sorb to the semiconductor layer and the absorption of light. Deposition generally includes forming a colloidal semiconductor solution, masking substrate 32 to expose the active area, and applying the solution to the active area of the substrate.

The colloidal solution is generally prepared (step 52) by dispersing semiconductor nanoparticles (here, $TiO_2$) in a suitable solvent, such as water, alcohols, ketones, and other organic solvents. For example, the solution can be prepared by incrementally adding about 20 mL of dilute nitric acid or acetic acid (pH about 3-4 in de-ionized water) to about 12 grams of $TiO_2$ in a mortar and pestle while grinding. For large-scale preparation of $TiO_2$ dispersions, techniques such as internal mixing or ball milling can be used. The titanium dioxide can have an average particle size of, e.g., about 21 nm and is available from Huls Degussa AG, D-6000, Frankfurt, Germany. Other particle sizes can be used. The acid is added in 1 mL increments after the preceding mixing and grinding has produced a uniform paste free of lumps. Alternatively, about 0.2 mL of acetylacetone can be added to about 1 mL of water and added to 12 grams of $TiO_2$ powder, followed by adding about 19 mL of water in 1 mL increments, while grinding. Alternatively, nanoparticles colloids, e.g., 2-100 nm, can be prepared from appropriate precursors using standard sol-gel techniques.

Other semiconductor particles can also be used including, for example, other oxides such as zirconium oxide, zinc oxide, and tungsten oxide, mixed oxides, sulfides, selenides, and tellurides.

The semiconductor particles can be deposited by a number of techniques, including, for example, spray coating, blade or knife coating, casting, spin casting, screen printing, and stencil printing.

Alternatively, substrate 32 is masked, for example, with adhesive tape or with a masking frame, to define a mold into which the colloidal solution can flow and to mask a portion of the conductive coating to which electrical contact can be made.

A portion of the colloidal solution is then applied (step 51) to the unmasked portion of the conductive coating of substrate 32. The solution is then drawn with a glass stirring rod or a drawdown bar to distribute the solution to a generally uniform thickness.

Substrate 32, with the colloidal solution deposited thereon, is then heated between about room temperature and about 70° C. for less than about 10 minutes to yield a thin film of the semiconductor particles adhered to the substrate. The thin film is partially dried.

After heating substrate 32 (step 57), the thin film of the semiconductor particles on the substrate is treated with a cross-linking agent. Without wishing to be bound to theory, it is believed that the cross-linking agent provides electronic and/or mechanical connections between the semiconductor particles and/or between the particles and the conductive coating on substrate 32. It is believed that these connections can provide semiconductor layer 36 with integrity and stability that, for example, mimic or approximate integrity and stability achievable by relatively high temperature sintering. The cross-linking agent, however, provides cell 30 with good performance without high temperature sintering, thereby permitting more materials, e.g., a flexible polymeric substrate with relatively low temperature stability, to be used in the construction of the cell.

Generally, semiconductor layer 36 can be cross-linked by contacting the layer with an agent that can bond, chemically and/or mechanically, with the semiconductor particles. The agent can be an appropriate semiconductor precursor or a sol-gel processable precursor.

Figure 4:
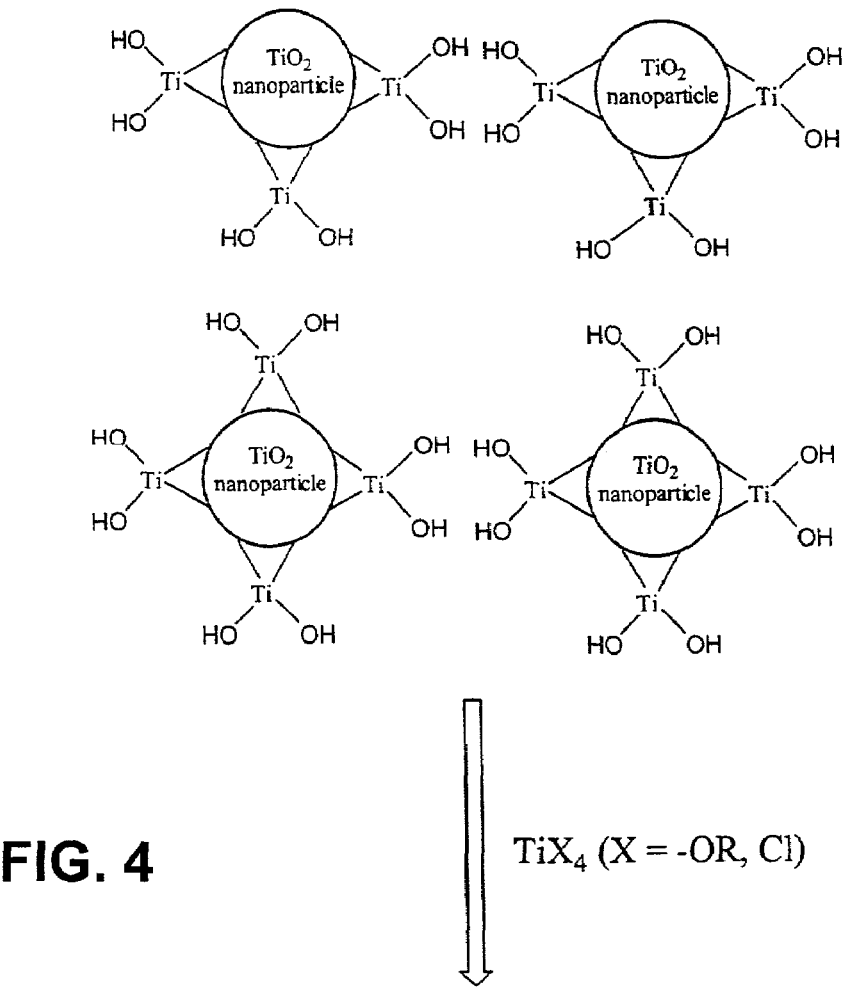
FIG. 4 is a schematic diagram of an embodiment of cross-linked metal oxide particles.
Figure 4:
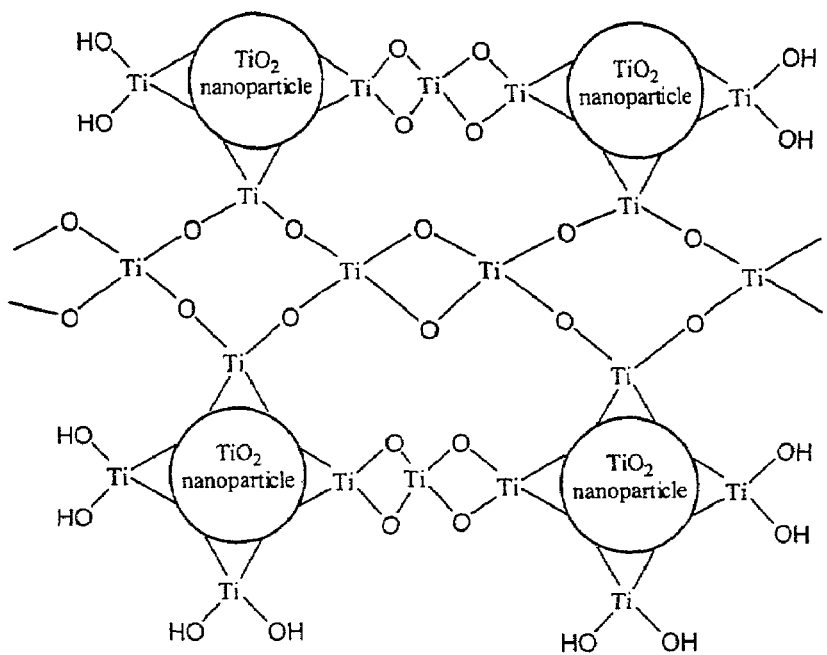

Preferably, the agent can exhibit similar electronic conductivity as the semiconductor particles. For example, for $TiO_2$ particles, the agent preferably includes Ti—O bonds, such as those present in titanium alkoxides. Referring to FIG. 4, it is believed that titanium tetraalkoxide can react with each other, with $TiO_2$ particles, and with the conductive coating on substrate 32, to form titanium oxide bridges that connect the particles with each other and with the conductive coating (not shown). As a result, the cross-linking agent enhances the stability and integrity of the semiconductor layer. The cross-linking agent can include, for example, an organometallic species such as a metal alkoxide, a metal acetate, or a metal halide. In other embodiments, the cross-linking agent can include a different metal than the metal in the semiconductor.

In an exemplary cross-linking step, a cross-linking agent solution is prepared (step 53) by mixing a sol-gel precursor agent, e.g., a titanium tetra-alkoxide such as titanium tetrabutoxide, with a solvent, such as ethanol, propanol, butanol, or higher primary, secondary, or tertiary alcohols, in a weight ratio of 0-100%, e.g., about 5 to about 25%, or about 20%. Generally, the solvent can be any material that is stable with respect to the precursor agent, e.g., does not react with the agent to form metal oxides (e.g. $TiO_2$). The solvent preferably is substantially free of water, which can cause precipitation of $TiO_2$.

The cross-linking agent can be applied (step 55) by contacting substrate 32 and the semiconductor particles with the cross-linking agent solution, e.g., by soaking the particles in the solution for about 10 minutes at room temperature. Other methods of applying the cross-linking agent include, for example, spraying the agent, e.g., as an aerosol, in neat form or in a suitable solvent, or passing semiconductor layer 36 through a solution of the cross-linking agent, or passing the semiconductor particles through an atmosphere having the cross-linking agent, e.g., an oven having 100% $TiCl_4$ gas.

Next, substrate 32, with a cross-linked semiconductor layer formed thereon, is heated (step 59). Heating dries substrate 32 by evaporating solvent, if any, from the cross-linking solution. Depending on the heating temperature, heating can also sinter the semiconductor particles to connect particles together and/or to connect the particles with the conductive coating of substrate 32. Generally, the heating temperature is dependent on the cross-linking agent used and the material of substrate 32. The heating temperature is selected to be less than the decomposition temperature of the cross-linking agent, or the temperature at which substrate 32 becomes unstable, e.g., melts or decomposes, whichever is less. For example, for a $TiO_2$ semiconductor layer cross-linked with titanium alkoxide, the heating temperature is up to 150° C. for a polymeric substrate such as PET, up to 400° C. for a KAPTON® substrate, and up to 500° C. for a glass substrate, although lower temperatures can be used. Heating time ranges from about 10 minutes to about 60 minutes. Referring again to FIG. 3, after heating, substrate 32 is a sintered electrode 54 having the substrate with deposited thereon a dried, cross-linked semiconductor layer.

Sintered electrode 54 is then treated with sensitizing dye. As discussed above, the dye is the primary absorber that harvests light and injects electrons to the semiconductor layer. Generally, the dye is selected based on its ability to provide optimum absorption in the light range, e.g., sunlight, that cell 30 is exposed to, its ability to transfer electrons to the semiconductor particles, and its effectiveness in complexing or sorbing to the semiconductor particles. For example, the dye can include functional groups, such as multiple carboxyl or hydroxyl groups, that can chelate to the semiconductor particles, e.g., to the Ti(IV) sites on a $TiO_2$ surface. Exemplary dyes include anthocyanins, porphyrins, phthalocyanins, eosins, and metal-containing dyes such as cis-di(thiocyanato)bis(2,2'-bipyridyl-4,4'-dicarboxylate) ruthenium (II).

A dye solution can be prepared (step 56) by dissolving a dye in an appropriate solvent. For example, cis-di(thiocyanato)bis(2, 2'-bipyridyl-4,4'-dicarboxylate) ruthenium (II) can be dissolved in ethanol, e.g., in the order of about tens to hundreds of micromolar concentration.

The dye can be applied (step 61) to sintered electrode 54 by soaking cross-linked semiconductor layer 36 in the dye solution for about 5 minutes up to a few hours. In some embodiments, the rate at which the dye adsorbs on semiconductor layer 36 can be increased by adsorbing a single molecular layer of a polycation on the semiconductor layer. The polycation can be any polymer with multiple positive charges on either the polymer backbone or on side chains, such as polyallylamine hydrochloride (PAH) or poly(diallylmethylammonium chloride) (PDAC). Other methods of applying the dye solution include, for example, spray coating. After application of the dye, excess dye is removed by washing the electrode with a solvent, such as ethanol.

The electrode is then heated (step 63) to remove residual solvent, e.g., ethanol. For example, the electrode can be heated at about 50° C. to about 80° C., for about 10 minutes. The resulting electrode is sensitized electrode 58 having, e.g., a deep brownish to red (dyed) semiconductor film.

After drying, polymeric polyelectrolyte layer 38 is deposited onto sensitized layer 36 of sensitized electrode 58. Referring again to FIG. 2, the electrolyte allows electrons to be transferred from a counter electrode (substrate 34 and catalyst layer 40) to sensitized semiconductor layer 36, thereby allowing the excitation-oxidation-reduction cycle of cell 30 to continue with exposure to light. The polyelectrolyte is preferably a polymeric, relatively viscous, e.g., jelly-like, material. As a result, the polyelectrolyte can be applied to sensitized layer 36 using techniques that may not be practical or feasible if, for example, the electrolyte were a liquid. These techniques include, for example, those that can be used in a continuous or semi-continuous process such as spray coating, roller coating, or knife or blade coating.

The polyelectrolyte can be prepared (step 60) by forming a solution having an ion-conducting polymer, a plasticizer, and a mixture of iodides and iodine. The polymer provides mechanical and/or dimensional stability; the plasticizer helps to provide relatively high ionic conductivity; and the iodides and iodine act as the redox electrolytes. The polyelectrolyte can include about 5-100%, e.g., 5-60%, 5-40%, or 5-20%, by weight of an ion-conducting polymer, about 0-95% e.g., 35-95%, 60-95%, or 80-95%, by weight of a plasticizer, about 0.05 M to about 10 M e.g., 0.05-2 M, 0.05-1 M, or 0.05-0.5 M, of organic or inorganic iodides, and about 0.01M to about 1 M e.g., 0.05-5 M, 0.05-2 M, or 0.05-1 M, of iodine. The ion-conducting polymer can be, for example, polyethylene oxide (PEO), polyacrylonitrile (PAN), polymethylmethacrylate (acrylic) (PMMA), polyethers, and polyphenols. Examples of plasticizers include ethyl carbonate, propylene carbonate, mixtures of carbonates, organic phosphates, and dialkylphthalates. Redox electrolytes may include other reversible organic and/or inorganic redox systems, such as $Fe^{2+}/Fe^{3+}$, $Co^{2+}/Co^{3+}$ or viologens.

A useful polymeric electrolyte includes about 10% of polyethylene oxide, about 90% of 1:1 by weight mixture of ethyl carbonate: propylene carbonate, about 0.05 M iodine, and about 0.5 M lithium tetramethylammonium iodide. The polymeric electrolyte has a relatively long shelf life (e.g., up to a few years), experience minimal phase segregation during processing or while cell 30 is in use, and can be used without processing, such as melting, prior to deposition on semiconductor layer 36.

The polyelectrolyte is deposited (step 65) on semiconductor layer 36 by blade coating techniques to yield an electrolyte-deposited, sensitized electrode 62. In some embodiments, electrode 62 can then be heated to remove residual solvent, e.g., acrylonitrile. For example, electrode 62 can be heat at about 60° C. to about 80° C., for about 5 minutes. Electrode 62, which includes substrate 32, dye-sensitized semiconductor layer 36, and polyelectrolyte layer 38, is then applied to a metallized substrate 64, which includes substrate 34 and catalyst layer 40.

Substrate 34 can be generally similar to substrate 32. That is, substrate 34 can be formed of a transparent and flexible material. For example, substrate 34 can be formed of polyethylene terephthalate (PET) or polyethylene naphthalate (PEN). Substrate 34 can have a thickness of about 50 to about 1,000 microns, such as, for example, about 100 to about 500 microns.

Similar to substrate 32, substrate 34 can also include a transparent and conductive coating deposited thereon. The coating, for example, indium tin oxide (ITO), can be deposited on the active area of substrate 34 by low temperature sputtering, for example, room temperature sputtering. A suitable conductor can be connected to the conductive coating. The transparent and conductive coating can be about 100 to about 500 nm thick, e.g., about 100 to about 300 nm, or about 100 to about 200 nm.

Metallized substrate or electrode 64 is formed by forming catalyst layer 40 (step 69) on the transparent and conductive coating on substrate 34. Catalyst layer 40 can include, for example, carbon, or preferably, platinum. For substrates 34 that are stable up to relatively low temperatures, catalyst layer 40 can be formed, for example, by thermal evaporation, room temperature sputtering or electrodeposition. For example, a thin platinum catalyst layer can be electrodeposited on the conductive coating of substrate 34 by using a solution with about 0.05 g/L $PtCl_4$ and 0.025 M HCl, a current density of about 1 mA/cm$^2$ for about 2-5 minutes. Catalyst layer 40 can be about 2 to about 10 nm thick, e.g., about 2 to about 3 nm thick.

Metallized substrate 64 is then applied (step 67) to electrolyte-deposited sensitized electrode 62 by contacting catalyst layer 40 with polyelectrolyte layer 38 to form a sensitized solar cell 66.

Solar cell 66 is then sealed at its perimeter with a polymer sealant, e.g., an epoxy or Surlyn® hot melt (available from DuPont), to minimize permeation of water and/or air into the cell, which can adversely affect cell performance. Alternatively, or in addition, cell 66 can be thermally sealed about its perimeter.

Sealed cell 66 is then laminated with a barrier to moisture and/or oxygen such as one ore more polymeric overlayers, e.g., a Surlyn® polymer (available from DuPont). Sealed and laminated cell 66 is then packaged, e.g., mounted on a support structure, to provide a finished solar module 68. The barrier may include UV stabilizers and/or UV absorbing luminescent chromophores (which emit at higher wavelengths) and antioxidants to protect and improve the efficiency of the cell.

The methods describe above include features that allow cell 30 to be manufactured in a continuous process. One feature, for example, is the cross-linked semiconductor layer that can exhibit good performance without the need for high temperature sintering. This expands the selection of substrates, such as flexible polymeric substrates with relatively low temperature stability, that can be used without sacrificing performance. Another feature, for example, is the viscous polymeric polyelectrolyte that can be applied to a dye-sensitized electrode during a continuous process, vis-à-vis, e.g., a liquid electrolyte that can run and may be difficult to apply.

Figure 5:
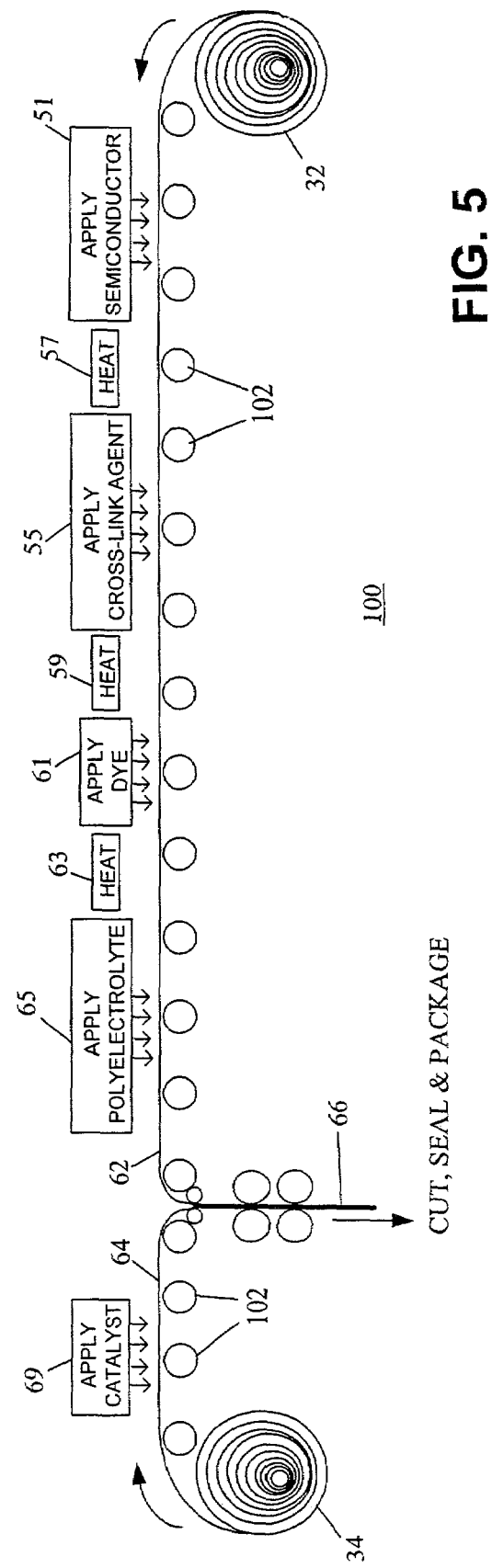
FIG. 5 is a schematic diagram of an embodiment of a continuous process for manufacturing a photovoltaic cell.

Referring to FIG. 5, a schematic diagram of a continuous roll-to-roll or sheet-by-sheet process 100 for manufacturing cell 30 is shown. Generally, metallized electrode 64 and electrolyte-deposited sensitized electrode 62, on two separate assembly lines, are formed continuously from reels having webs of substrate material. The electrodes are then brought together to form cells 66. Individual cells 66 or sets of cells 66 can then be cut from the go joined web, sealed, and packaged.

Metallized electrode 64 and electrolyte-deposited sensitized electrode 62 can be formed according to the methods described above and in FIG. 3. Metallized electrode 64 can be continuously formed by providing a reel or spool of a flexible web of substrate 34, e.g., ITO-coated PET film, guiding the web along rollers 102, and depositing catalyst layer 40 by sputtering. Metallized electrode 64 can be fed to be applied to electrode 62. Similarly, electrode 62 can be continuously formed by providing a reel of a flexible web of substrate 32, and guiding the web along rollers 102 to subject predetermined areas, i.e., the active areas, of the web to the processes described above (FIG. 5). Electrodes 62 and 64 can then be applied together to form solar cell 66.

The following examples are illustrative and not intended to be limiting.

EXAMPLE 1

A dye-sensitized solar cell having flexible substrates was made according to the following procedures.

A PET substrate (200 microns thick, 10 mm×10 mm) was coated with a 200 nm thick ITO coating by thermal evaporation. A colloidal TiO$_2$ solution was prepared by dispersing P25 particles in water (pH 3-4). The TiO$_2$ was deposited on the PET substrate by spin coating. After deposition, the electrode was heated at about 50° C. for about 10 minutes.

The TiO$_2$-coated PET substrate was then soaked in a 20% titanium tetrabutoxide solution in ethanol (wt/wt) for 15 minutes. After soaking, the substrate was removed from the solution, dried at about 50° C. for about 30 minutes, and dried at about 120° C. for about 30 minutes.

The sintered substrate was dye-sensitized by soaking the substrate in a solution of cis-di(thiocyanato)bis(2,2'-bipyridyl-4,4'-dicarboxylate) ruthenium (II) in ethanol (1 mg/mL) overnight.

A redox polyelectrolyte (a liquid electrolyte including 1 M LiI, 0.05 M iodine, 1 M t-butyl pyridine in 3-methoxy propionitrile) was coated on the dye-sensitized, sintered substrate, and sandwiched with a second PET substrate coated with an ITO conductive layer (200 nm) and a platinum catalyst layer (2.5 nm thick).

The cell exhibited a solar conversion efficiency of about 3%.

EXAMPLE 2

A dye-sensitized solar cell having rigid substrates was made according to the following procedures.

An ITO-coated glass slide (surface resistance 8 $\Omega$Q/cm$^2$) was coated with TiO$_2$ nanoporous film by spin coating from a TiO$_2$ dispersion (7 micron thick). The coated slide was dried at room temperature for 30 minutes and sintered at 450° C. in an oven for 1 hour.

The sintered slide was dye-sensitized by soaking the slide in a solution of cis-di(thiocyanato)bis(2,2'-bipyridyl-4,4'-dicarboxylate) ruthenium (II) in ethanol (1 mg/mL) overnight.

A redox polyelectrolyte (10% polyethylene oxide, 90% 1:1 ethyl carbonate:propylene carbonate, 0.05 M iodine and 0.5 M LiI in acetonitrile) was coated on the substrate, and sandwiched with a second glass slide coated with an ITO conductive layer (200 nm) and a platinum catalyst layer (2.5 nm thick).

The cell exhibited a solar conversion efficiency of about 7.3%. The polyelectrolyte was stable up to at least 180 days with no observable evidence of phase segregation.

OTHER EMBODIMENTS

It is to be understood that while the invention has been described in conjunction with the detailed description thereof, the foregoing description is intended to illustrate and not limit the scope of the invention, which is defined by the scope of the appended claims.

For example, while the above features and methods have been described as applied to photovoltaic cells, the features and methods can be applied to other applications, such as electrochromic windows and ceramic coatings, e.g., TiO$_2$ coatings.

Other embodiments of photovoltaic cells can include substrates made of rigid material, such as glass, and, for example, the polyelectrolyte described above.

In other embodiments, substrates 32 and/or 34 can be thin foils, e.g., relatively transparent metal foils such as titaniun or molybdenum foils about 5-50 microns thick. The transparent and conductive coating can include other materials besides ITO, such as fluorine-doped tin oxide.

Cell 30 can be a hybrid system having, for example, one rigid substrate and one flexible substrate. For example, the photoelectrode can include a flexible substrate formed in a continuous process as described above, and applied to a rigid substrate, e.g., $SnO_2$:F coated glass, in a separate, non-continuous process.

Other aspects, advantages, and modifications are within the scope of the following claims.

What is claimed is:

1. A photovoltaic cell, comprising:
    a first substrate having semiconductor particles disposed thereon, and an electronically conducting, molecular crosslinking agent that forms oxide bridges to the particles; and
    a second substrate electrically connected to the first substrate,
    wherein the crosslinking agent is different than the semiconductor particles, comprises a metal, comprises an identical chemical bond as in the semiconductor particles, and provides an electronic connection between the semiconductor particles.

2. The cell of claim 1, wherein one of the substrates is flexible.

3. The cell of claim 1, wherein one of the substrates comprises a polymeric material.

4. The cell of claim 1, wherein one of the substrates comprises a polyimide.

5. The cell of claim 1, wherein the semiconductor particles are between the first and second substrates.

6. The cell of claim 5, further comprising a polymeric polyelectrolyte between the first and second substrates.

7. The cell of claim 6, wherein the polyelectrolyte comprises:
    about 5% to about 100% by weight of a polymer; and
    about 5% to about 95% by weight of a plasticizer; and
    about 0.5 M to about 10 M of a redox electrolyte.

8. The cell of claim 1, further comprising a dye disposed on the semiconductor particles.

9. The cell of claim 1, wherein the crosslinking agent comprises a chemical element that is of the same type as a chemical element in the semiconductor particles.

10. The cell of claim 9, wherein the chemical element is the metal.

11. The cell of claim 9, wherein the chemical element is selected from the group consisting of titanium, zirconium, and zinc.

12. The cell of claim 1, wherein the chemical bond is a metal to non-metal bond.

13. The cell of claim 1, wherein the chemical bond is a metal-oxygen bond.

14. The cell of claim 1, wherein both of the substrates are flexible.

15. The cell of claim 1, wherein both of the substrates comprise a polymeric material.

16. The photovoltaic cell of claim 1, wherein the semiconductor particles comprise nanoparticles.

17. The photovoltaic cell of claim 16, wherein the nanoparticles have a diameter of up to about 100 nanometers.

18. A photovoltaic cell, comprising:
    a first electrode comprising semiconductor particles and an electronically conducting, molecular crosslinking agent that forms oxide bridges to connect the particles, the crosslinking agent being different than the semiconductor particles and comprising a metal;
    a second electrode; and
    a polymeric electrolyte between the first and second electrodes, the electrolyte comprising
    about 5% to about 100% by weight of a polymer;
    about 5% to about 95% by weight of a plasticizer; and
    about 0.5 M to about 10 M of a redox electrolyte,
    wherein the crosslinking agent comprises an identical chemical bond as in the semiconductor particles, and provides an electronic connection between the semiconductor particles.

19. The photovoltaic cell of claim 18, wherein the semiconductor particles comprise nanoparticles.

20. The photovoltaic cell of claim 19, wherein the nanoparticles have a diameter of up to about 100 nanometers.

* * * * *